United States Patent [19]

Hashimoto et al.

[11] Patent Number: 4,918,599
[45] Date of Patent: Apr. 17, 1990

[54] INTERRUPT CONTROL SYSTEM

[75] Inventors: Shigeru Hashimoto, Inagi; Yasuyuki Higashiura, Tachikawa; Yoshiyasu Sugimura, Tokyo; Hisayuki Nishimura, Kawasaki, all of Japan

[73] Assignee: Fujitsu Limited, Kawasaki, Japan

[21] Appl. No.: 912,094

[22] Filed: Sep. 29, 1986

[30] Foreign Application Priority Data

Sep. 30, 1985 [JP] Japan ............................. 60-217079

[51] Int. Cl.⁴ ............................................. G06F 9/46
[52] U.S. Cl. .............................. 364/200; 364/241.4; 364/241.2
[58] Field of Search ... 364/200 MS File, 900 MS File

[56] References Cited

U.S. PATENT DOCUMENTS

| | | | |
|---|---|---|---|
| 3,905,025 | 9/1975 | Davis et al. | 364/200 |
| 3,925,766 | 12/1975 | Bardotti et al. | 364/200 |
| 4,001,783 | 1/1977 | Monahan et al. | 364/200 |
| 4,047,161 | 9/1977 | Davis | 364/200 |
| 4,080,649 | 3/1978 | Calle et al. | 364/200 |
| 4,481,583 | 11/1984 | Mueller | 364/200 |
| 4,584,644 | 4/1986 | Larner | 364/200 |
| 4,672,534 | 6/1987 | Kaniya | 364/200 |
| 4,799,148 | 1/1989 | Nishioka | 364/200 |

Primary Examiner—Gareth D. Shaw
Assistant Examiner—Debra A. Chun
Attorney, Agent, or Firm—Staas & Halsey

[57] ABSTRACT

An interrupt control system in which a main process device executes an interrupt process, having a high process priority. The process priority is registered in a table, corresponding to each interrupt generating source, and an intermediate process device receives an interrupt signal from each interrupt generating source, obtains the corresponding process priority from the table and informs the main process device of the interruption. Accordingly, the process priority can be easily changed, and the system has a small size because the interrupt circuit for the main process device is centralized.

6 Claims, 10 Drawing Sheets

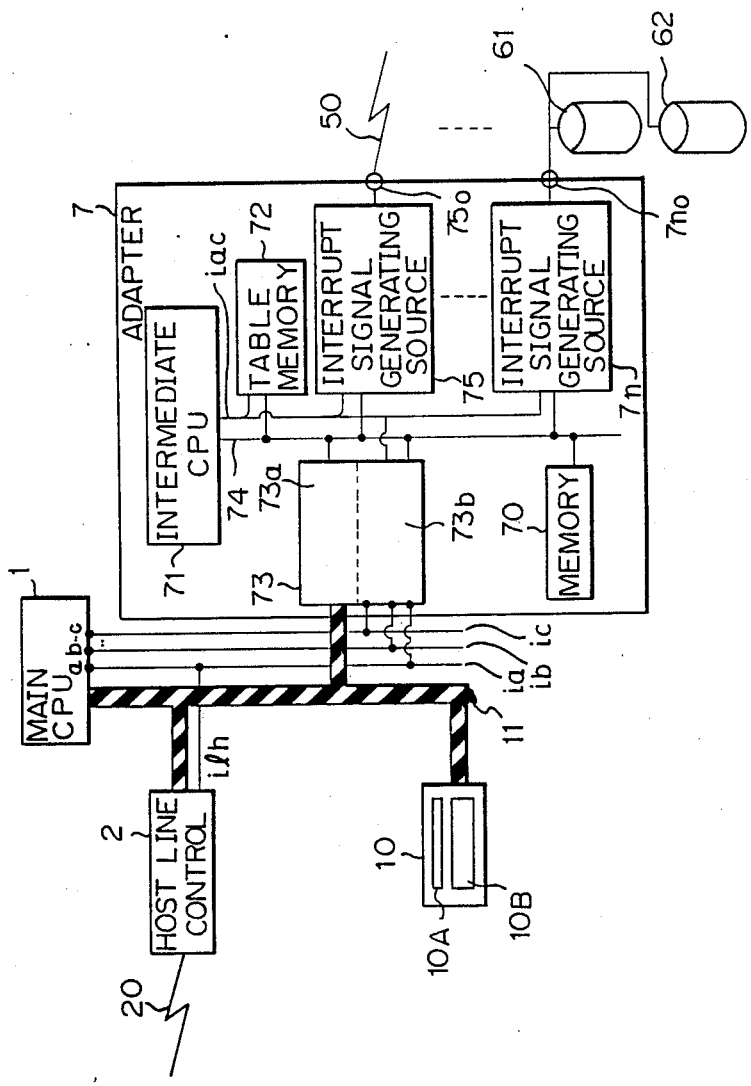

INTERRUPT CONTROL SYSTEM

BACKGROUND OF THE INVENTION

The present invention relates to a process executing system in which interrupt generating sources of a plurality of peripheral devices, such as the control circuit thereof, are connected to the main process device and, more particularly, to an interrupt control system of the process executing system in which the interrupt signal and the process priority are input from the peripheral device side to the main process device.

Usually, in a processing device such as a main electronic computer, a terminal control apparatus, or a communication control apparatus, a plurality of peripheral devices such as a magnetic disc device, floppy disc device circuit, a keyboard, a console panel, a line printer, a social printer, etc, are connected thereto, and a process is executed between these devices and the processing device, based on an interrupt signal routine.

Further, for the process executed by the processing device, usually a process priority (known as a process level) is previously allocated. When the process levels to which executions are requested collide, the processing device executes a priority sequence in which the process having a high process level in accordance with the process level is given priority.

An input/output process which is based on the interrupt signal mentioned above is set to a level higher than the process level now occupied by a program task, and also is set to a plurality of levels (also known as an interrupt level) which are different in each peripheral device, so that processing of the whole synthetic system proceeds smoothly.

However, in the above-mentioned conventional system, the interrupt lines from each interrupt generating source are individually connected in the so called wired OR manner, that is, fixedly connected to the interrupt signal wires by a bus line, and accordingly, when each system is formed, the connection must be made in the order of the process interrupt priority of each interrupt generating source.

That is, the interrupt priority cannot be changed and, therefore, the general freedom of the system is curtailed.

Further, as each terminal of a plurality of the interrupt generating sources is connected in a straight line, (e.g., an interrupt process at the main CPU) an interrupt (process including a collision process when more than two interrupt signals co-exist at the same terminal), becomes large scale which gives rise to a drawbacks such as creating a large load at the main CPU.

SUMMARY OF THE INVENTION

An object of the present invention is to remove the above-mentioned drawbacks by providing an interrupt control system in which the load for the main CPU is light and the interrupt priority may be easily changed.

The above-mentioned object can be achieved by providing an interrupt control system in a process execution system which provides a plurality of interrupt signal generating sources for generating interrupt signals, a main process device for receiving said interrupt signals and interrupting an executing process in accordance with a process priority of the interrupt signal generating source generating the interrupt signal, to execute the process for the interrupt signal, including an adapter means which provides an intermediate process device connected to a plurality of the interrupt signal generating sources having a different process priority and a table memory means connected to the intermediate process device for storing the process priority information corresponding to the interrupt generating source;

the interrupt process device receives the interrupt signal from the table means, and the process priority information of the corresponding interrupt signal generating source, and informs the main process device of the process priority together with the interrupt signal.

Further features and advantages of the present invention will be apparent from the ensuing description with reference to the accompanying drawings however the scope of the invention is not limited to those features.

BRIEF DESCRIPTION OF THE DRAWINGS

FIG. 3 is a block diagram of one embodiment of an interrupt control system according to the present invention;

FIGS. 8, 8A and 8B are flow charts illustrating the operation of another embodiment of the present invention.

DETAILED DESCRIPTION OF THE PREFERRED EMBODIMENTS

Figure 1:
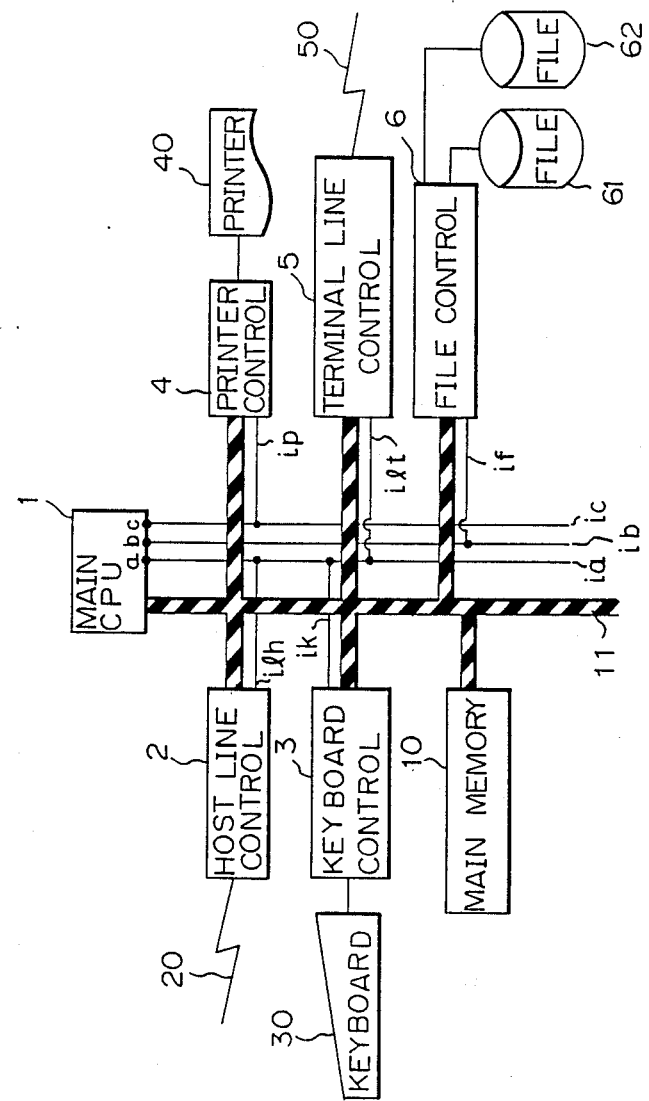
FIG. 1 is a block diagram of one example of a conventional interrupt control system.

FIG. 1 is a block diagram of a conventional process executing system, including an interrupt process.

A main process device 1 (hereinafter called main CPU) is electrically connected via a bus line 11, which is formed by an address signal line and a data signal line, to each peripheral device, including a host side line control circuit 2, a key board control circuit 3, a printer control portion 4, a terminal side line control circuit 5, a file control circuit 6, and a main memory circuit 10.

Further, the main CPU 1 is provided with a plurality of interrupt terminals a, b, and c, and when the interrupt signal is supplied to each interrupt terminal, the process being executed is interrupted to allow the interrupt process. The main CPU 1 previously allocates a different process priority to each terminal supplying the interrupt signal. In accordance with this process priority, when the priority level of the interrupted process is high, the interrupt process is halted and the original process is executed. Where the interrupt process has the higher level, the interrupt process is completed.

Each of interrupt terminals a, b, and c is joined by interrupt signal lines $i_a$, $i_b$, $i_c$, respectively in the form of a control bus line. The interrupt signal line $i_a$ is connected to an interrupt signal line ilh of the host line control circuit 2, an interrupt signal line ik of the keyboard control circuit 3, and an interrupt signal line ilt of the terminal side line control circuit 5 to form a wired OR. Further, the interrupt signal line $i_b$ of the interrupt signal terminal b is connected by an interrupt signal line $i_f$ of the file control circuit 6 to form a wired OR, and the interrupt signal line $i_c$ of the interrupt signal terminal c is connected by an interrupt signal line $i_p$ of the printer control circuit 4. It is assumed that the interrupt priority is set at first to the terminal a, then to the terminal b, and finally, to the terminal c.

In FIG. 1: 20 is a circuit; 30 a keyboard; 40 a printer; 50 a circuit; and 61, 62 file devices. One example of the operation will now be explained by using the above-mentioned construction.

The main CPU 1 executes the process in accordance with the program stored in the main memory 10.

During this operation, if the data is received at the circuit 20, the host line control circuit 2 raises the level of the signal of the interrupt signal line ilh. This signal is received via the signal line $i_a$ and interrupt signal terminal a of the main CPU 1.

When the level of the signal of the interrupt signal terminal a rises, the main CPU 1 temporarily interrupts the program now executing the proess, and judges whether the priority of the process now being executed is higher or lower than the priority allocated to the interrupt signal terminal a.

As a result, when the process level of the interrupt terminal a is higher, a status register (not shown) is read, and the main CPU 1 judges whether the interrupt generating source from this status register is the host line control circuit 2, the keyboard control circuit 3, or the terminal line control circuit 5.

This status register is allocated by each one bit in accordance with the interrupt signal generating source.

After the process priority order is determined and the interrupt signal generating source is recognized, the main CPU 1 communicates via the bus 11 with the corresponding interrupt signal source; in this case, the host line control circuit 2.

Figure 2:
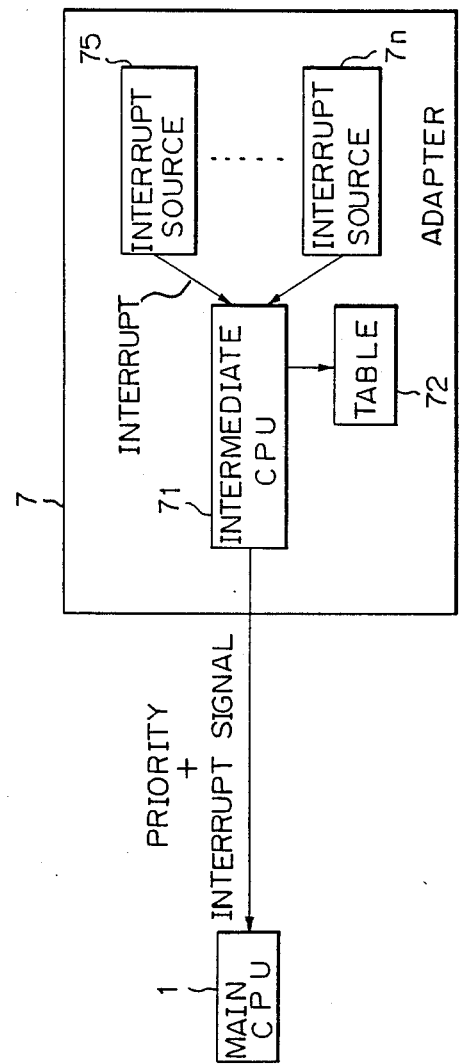
FIG. 2 is a block diagram illustrating schematically the present invention.

In FIG. 2, in the present invention, an adapter 7 is provided. In the adapter 7, the interrupt signals from interrupt signal generating sources 75, ..., 7n are received as a whole, and the conflict process concerning the interrupt signal generating sources 75, ..., 7n is transferred to an intermediate process device 71 which outputs the process to an interrupt signal line. Further, the adapter 7 provides a table memory means 72, when the intermediate process device 71 obtains the process priority information corresponding to the interrupt signal generating source from the table means 72, the device 71 selects only the corresponding plurality of interrupt signal lines, from the interrupt signals line, based on that information, and raises the level of that signal.

Further, when the means for previously allocating a priority to each of the plurality of interrupt signal lines is not used, but only one interrupt signal line is used, the process priority information can be supplied from the adapter 7 to the main CPU, after the interrupt signal is supplied to the main CPU. By using the construction shown in FIG. 1, even if the process priority is different for each interrupt signal generating source, the priority information corresponding to the interrupt signal generating sources can be obtained by using the table means, and thus the correct information can be sent to the main CPU.

The process priority in each interrupt signal generating source can be changed by merely replacing or re-writing the table means. Accordingly, variation of the priority is easily carried out and a high degree of freedom of choice is made available.

FIG. 3 is a block diagram of the whole system of an embodiment of the present invention.

In FIG. 3, the same symbols are used in the previous drawings denote the same elements. Further, in the drawing; 73 is an interface logic circuit which will be explained hereinafter with reference to FIG. 4A and FIG. 4B; 74 is a local bus in the adapter 7; $i_{ac}$ is an interrupt signal line in the adapter 7; 75o, 7n0 are connectors which electrically connect each of the control circuits, i.e., the interrupt signal generating source in the adapter 7 and peripheral circuits, that is, in the drawing, the terminal side line 50 and the file devices 61, 62.

Further, the interface logic circuit 73 is formed by an interface register control circuit 73a including a receiver group 73a2, which will be explained in detail with reference to FIG. 4A, and an interrupt control circuit 73b, which will be explained in detail with reference to FIG. 4B.

The operation of the above will now be explained.

[I] Process for registering the interrupt level.

Figure 5:
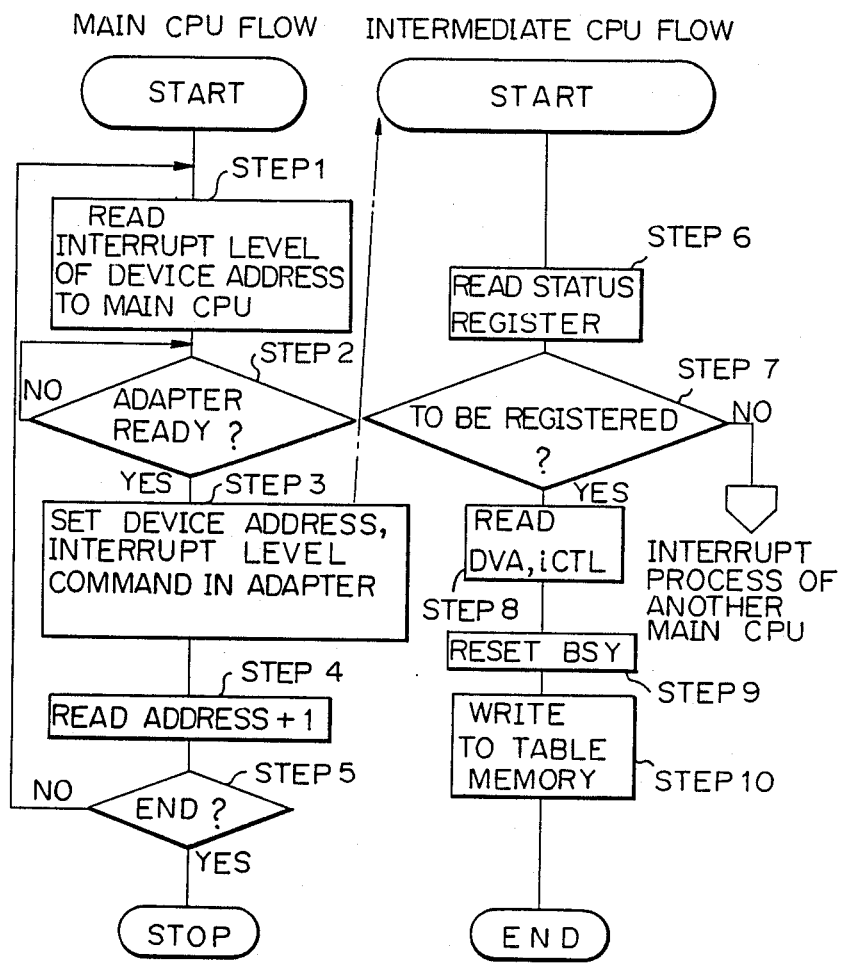
FIG. 5 is a flow chart explaining the operation of one embodiment of the present invention.

FIG. 5 is a process flow chart of the intermediate CPU 71 and the main CPU 1 for storing the interrupt level for each of the interrupt signal generating sources 75~7n in FIG. 3 into the table memory 72.

The operation of a process for registering the interrupt level shown in FIG. 3 and FIG. 4A will be explained with reference to these drawings.

Figure 4A:
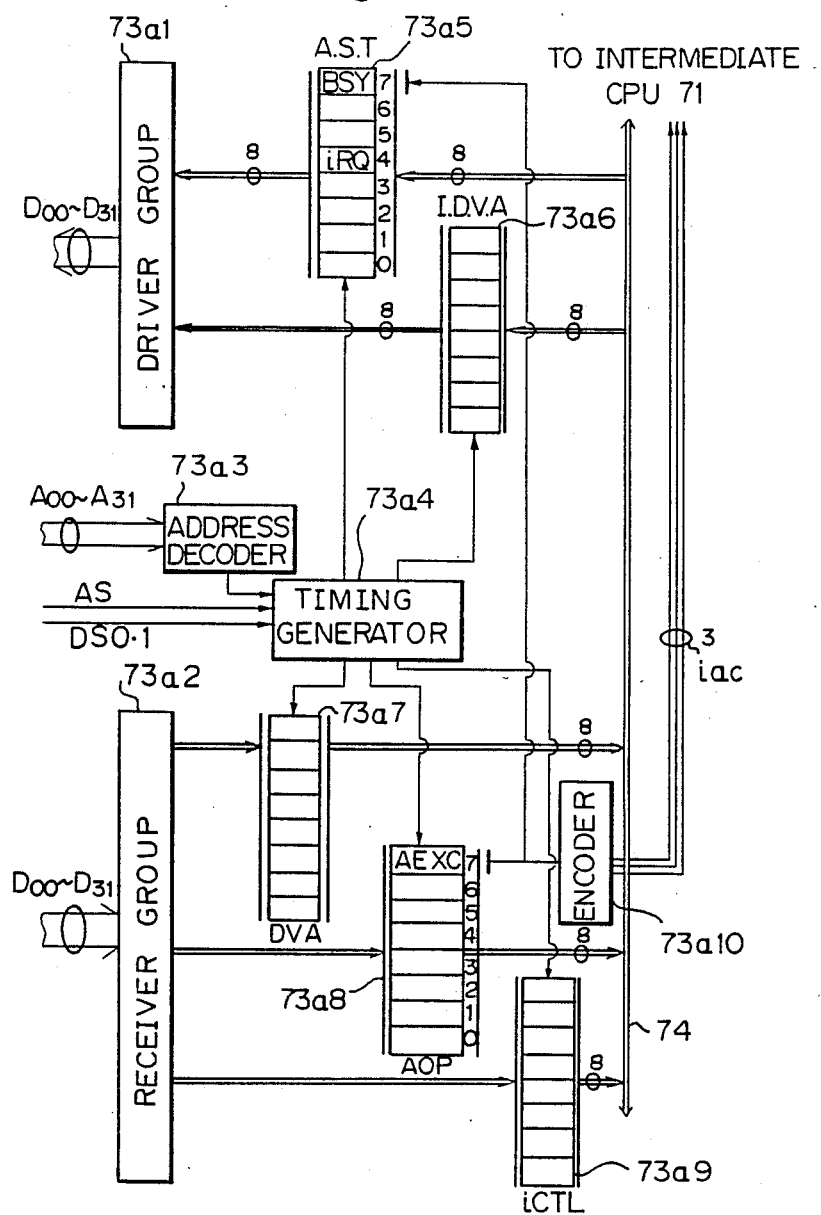
FIGS. 4A and 4B are block diagrams showing essential portions of one embodiment of the present invention.

In FIG. 4A, the bus line 11 shown in FIG. 3 is shown as a 32 address bus A00~A31 and a 32 data bus D00~D31.

(Process flow of the main CPU)

Step 1

In a system generation, or during a system operation, the addresses of the interrupt signal generating sources 75~7n (called a device address DVA) stored in the adapter 7 and each interrupt level are set in a predetermined address region of the main memory 10 in FIG. 3, and then the flow shown in FIG. 5 is started.

The main CPU 1 reads one device address, and the interrupt level of the device thereof, (the interrupt signal generating source) from a top address of the predetermined address region mentioned above from the main memory 10 to the internal register.

Step 2

Next, the state of the adapter 7 is judged.

The intermediate CPU 71 displays a flag to the interface register control circuit 73a to show whether the adapter 7 is now busy or in ready state, and the main CPU 1 reads and determines this condition.

As shown in detail in FIG. 4A, the circuit (the interface register control circuit) provides a register 73a5 (A.S.T.; adapter status register), and a flag BSY showing the busy state/ready state is provided at a seventh bit position of this register 73a5.

The intermediate CPU 71 always displays, via the data bus 74, whether it is in the ready state or not to the register 73a5.

In this step, the main CPU 1 specifies the register 73a5 in the address bus A00~A31. Accordingly, the output is generated from the address recorder 73a3, and a driver 73a1 is driven via a timing generating circuit 73a4. Then, the main CPU 1 reads the register 73a5 via the data bus D00~D31 in the bus line 11.

Next, the main CPU 1 judges a logic level of the bit corresponding to a position of the flag BSY of the register 73a5 and, for example, if it is at a logic "0" level, it is judged that it is in a ready state. If it is at a logic "1" level, it is judged to be in a busy state (during operation).

When the register 73a5 is in the busy state, the main CPU 1 repeats this step 1 until the intermediate CPU 71 rewrites the flag BSY of the register 73a5 to the logic level "0".

On the other hand, if the register 73a5 is in the ready state, the main CPU 1 moves to the next step.

Step 3 Set device address in adapter.

In this step, the main CPU 1 supplies the address signal AS which specifies that only registers 73a7, 73a8, 73a9, in the group of the interface registers of the adapter 7 receive the address signal.

At the same time, the device address, of which the interrupt level should be registered (for example, the address of one interrupt signal generating source in the interrupt signal generating source 75~7n) is sent to the data bus lines D00~D07 corresponding to the register 73a7.

Further, the interrupt level information formed by a total of 6 bits, 3 bits of which are formed as a main interrupt level and the other 3 bits formed as a sub-interrupt level, is transferred to the data bus lines D16~D29 corresponding to the register 73a9 (iCTL: Interface Control).

The command information, formed by the command showing the interrupt level to be registered and the data of the flag AEXC at the seventh bit position for generating the interruption to the intermediate CPU 71, which becomes level "1", is transferred to the data bus line D08~D15 corresponding to the registeer 73a8 (AOP: Adapter Operation Register).

Accordingly, the address decoder 73a3 generates a signal, and in accordance with this signal, the timing generator circuit 73a4 supplies a set signal to each of the registers 73a7~73a9, and the signal appearing in the data bus signal lines D00~D31 is set in the registers 73a7~73a9.

When a command information is set in the register 73a8, the flag AEXC starts an encoder 73a10, and a parallel 3 bits code which shows that it is an interrupt from the interface register control circuit is generated as the interrupt signal to the interrupt signal line i$_{ac}$ of the intermediate CPU 71.

By this interrupt signal, the intermediate CPU 71 interrupts the process during execution, and this interrupt process is executed after Step 6.

Further, the output of the flag AEXC, is operated so that the information "1" showing the busy state is written to the busy flag BSY of the register 73a5.

Step 4

When the transfer of this information is ended, the main CPU 1 steps up the read address for the main memory 10 so as to step up the stored address of the information for the next device.

Step 5

When the result of this step up is outside the above mentioned predetermined region, it is judged that the registering process of the main CPU 1 is ended and that the operation is completed.

When the result of this step up is inside the predetermined region, this result is transferred to the step 1 as the read top address and this is repeated hereinafter.

(Process Flow in the intermediate CPU 71)

The intermediate CPU 71, in the interrupt signal line i$_{ac}$, automatically selects the interrupt process program specified by 3 bits and executes the same.

Therefore, when eight interrupt generating sources for the intermediate CPU 71 exist, if a 3 bit code is allocated to each interrupt generating source, the program at each interrupt generating source can be formed. For example, as shown by this embodiment, if the main CPU 1 allocates each kind of interruption for the intermediate adapter as one code, one interrupt program may process the interrupt generating source.

Step 6

By the interruption as mentioned above, the intermediate CPU 71, as the interrupt process for the interface register control circuit 73 which is the interrupt generating source, firt reads via a local bus 74 the register 73a8 of the interface register control circuit 73.

Step 7

Based on the information obtained by this read operation, the intermediate CPU 71 judges the cause of the interruption.

This step 7 includes the judgement process for the interruption of each interrupt generating source mentioned hereinafter. However, if the information of the register 73a8 is judged to be a command, which specifies the process for registering to the table memory 72, the flow is transferred to a next step.

Step 8

In this step 8, the intermediate CPU 71 reads a device address (DVA) and an interrupt level (iCTL) stored in the register 73a7, shown in FIG. 4A.

Step 9

In step 9, the intermediate CPU 71 rewrites the busy flag BSY of the register 73a5 in FIG. 4A to a logic level "0" and displays a ready state.

Step 10

In step 10, the intermediate CPU 71 stores the interrupt level information in an address corresponding to the device address of the table memory 72 shown in FIG. 3.

Figure 6:
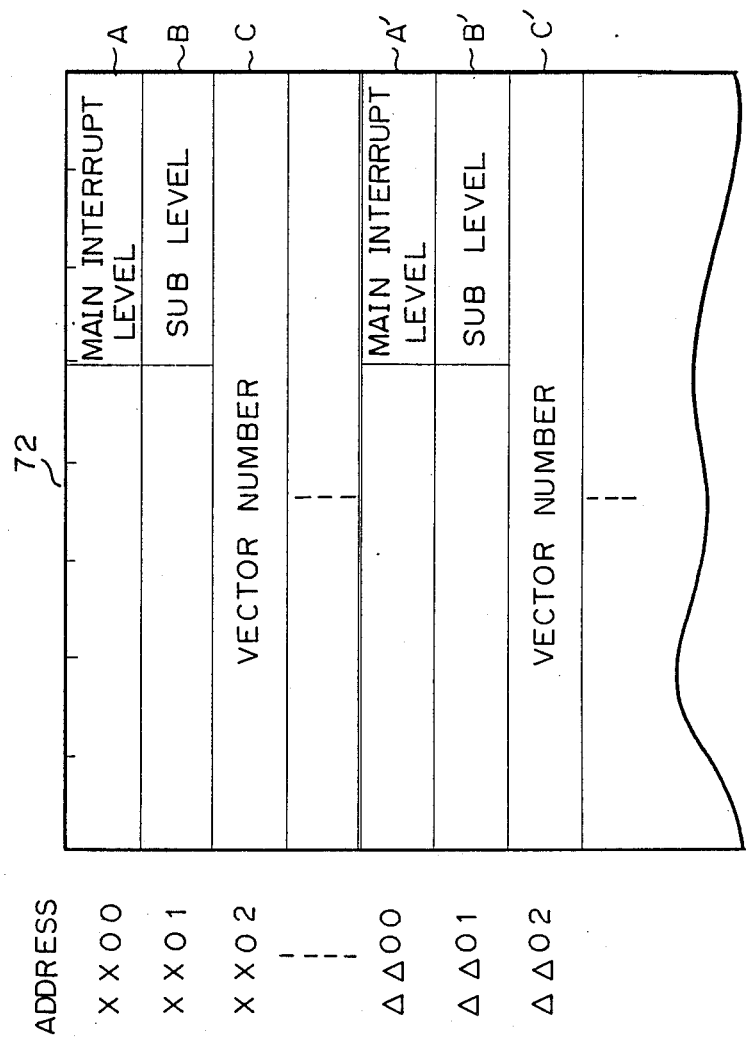
FIG. 6 is a diagram showing a table map in FIG. 2.

The stored state in the table memory 72 is shown in FIG. 6. Among the interrupt level information concerning the main interrupt level A, a lower address of the device address "XX" (hexadecimal two digit) is stored in the address of 00 (hexadecimal) that is, in the address "XX00". The sub interrupt level B is stored in the address "XX01".

Further, a head address of the interrupt process program on the main memory 10, a so-called vector number C, is stored in the address "XX02" corresponding to the device address "XX".

Concerning this vector number C, a mechanism for automatically previously storing C in the table at the time of system generation may be provided, or it may be stored as follows. The bits of the data bus D00~D31 (the data bus D24~D31) are used, and further an 8 bit register is added to the interface register control circuit 73a and at the time of the above-mentioned step 3, this vector number of 8 bits is received from the main CPU 1 via the circuit 73b and is stored in the table memory 72.

The address in the table memory 72 is successively different at every device stored, for example "XX00~XX02" for the printer and the address "ΔΔ00~ΔΔ02" for the circuit 50 are allocated one after another, and the main interrupt level is stored in each address. The main interrupt levels, A, A', A", ..., sub levels B, B', B", and vector numbers C, C', C", ... are stored.

In FIG. 5, when this information is completely written in the table memory, the interrupt process is ended.

At this time, in FIG. 5, step 2 of the main CPU 1 is actuated, and as mentioned above, it goes to the process for registering the next device address.

By repeating this process, the interrupt level for each of the plurality of interrupt generating sources 75~7n included in the adapter 7 is stored in the table memory 72 as shown in FIG. 6.

Here, the interrupt level of the embodiment will be explained with reference to FIG. 6. In the embodiment, the main interrupt level A is 3 bits, and 7 levels exist. When the keyboard, a plurality of file devices, the data transmission circuit, the operation panel (maintenance panel), and a printer are included in the adapter 7 as interrupt signal generating sources, the direct input means by the operator such as the key board, the operation panel (key input devices), are set at a higher interrupt level than the indirect input means such as the file devices. Accordingly, the data to be loaded in the memory exists in the file device, thus this data is usually loaded. However, by giving a priority to the operation of the key input device (i.e., an interruption of the load) the instruction for another process has a priority at the main CPU 1, which is advantageous in man/machine interface operations.

Therefore, if the most significant level "1" is allocated as the main interrupt level from the key input device, the next significant level "2" is allocated as the main interrupt level of the file device. The level "000" shows no interruption.

Further, a sublevel B is provided as the interrupt level, in addition to the main interrupt level A.

This sub level B is formed by 3 bits, that is, 8 levels.

The sub level includes five levels of each of the 7 levels of the main interrupt level A.

Figure 7:
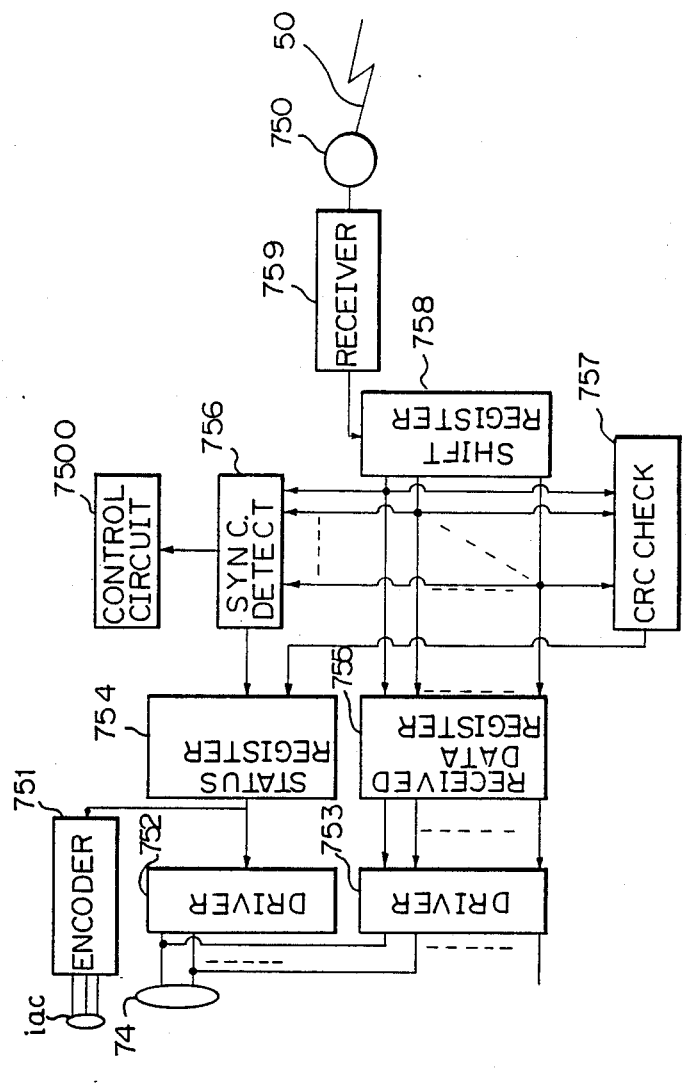
FIG. 7 is a block diagram of a control circuit used as the interrupt signal generating source shown in FIGS. 2 and 3.

Therefore, as shown in FIG. 4a, 7×8=56 levels exist as the interrupt levels, and at least 56 peripheral apparatuses can be connected, and an interrupt level can be allocated to each of the 56 peripheral apparatuses.

[II] Interrupt process for the main CPU 1 by the adapter 7.

In FIG. 3, the interruption can be made from any of the interruption generating sources 75~7n to the intermediate CPU 71. In accordance with this interruption, the intermediate CPU 71, after sending the information to the main memory 10, carries out the interruption to the main CPU 1 at the interrupt level corresponding to the interrupt generating source causing the interruption.

In this embodiment, the operation based on the high level data transmission protocol of the receiving line control circuit of the interrupt signal generating source 75, as the interruption signal generating source in FIG. 3, will be explained.

Further, if there is another interrupt signal generating source, for example, the file control circuit 6 explained in the conventional example, the keyboard control circuit 3, the printer control circuit 4, or a console control circuit (not shown in the drawing), a similar operation is carried out concerning the interrupt process.

FIG. 7 is a block diagram of the line receiving control circuit as the interruption generating source 75.

Figure 8A:
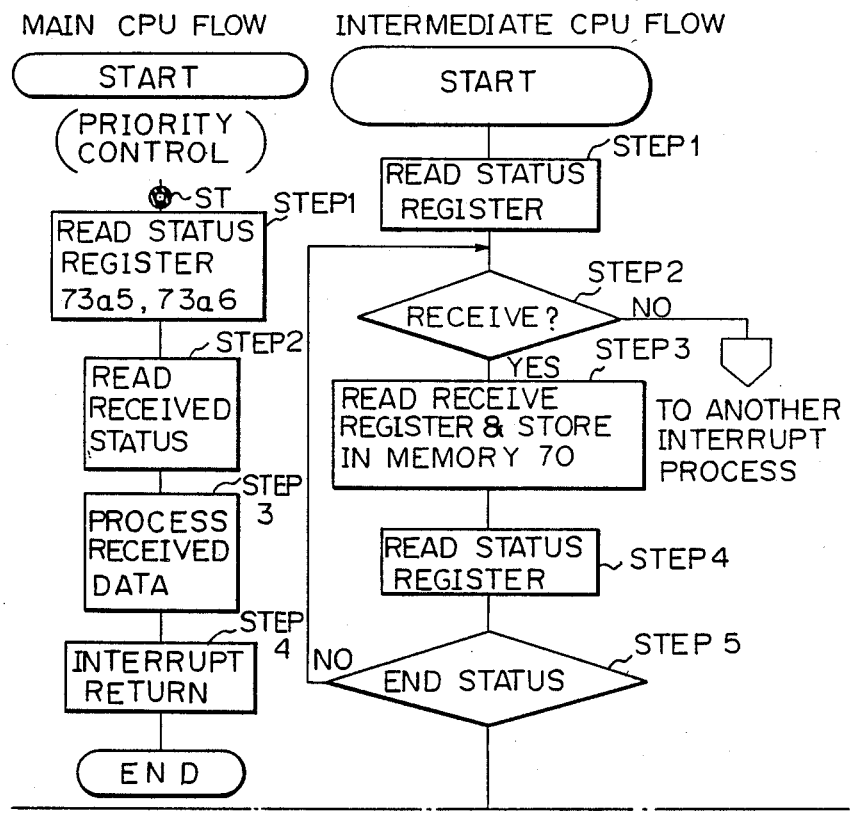

In this figure, the same symbols as those already mentioned show the same elements. FIGS. 8A and B are flow charts of the receiving interrupt process.

Hereinafter, the operation of the interrupt process for the main CPU 1 will be explained with reference to FIG. 3 and FIGS. 8A and B.

At the time at which the receiving operation is started at the line receiving control circuit as the interruption generating source 75, the main CPU 1 and the intermediate CPU 71 in FIG. 3 are carrying out another process or waiting for an interruption.

In FIG. 7, a serial data from the terminal side circuit 50 is shifted, in order, via the connector 750 and the receiver 759 to the shift register 758, and stored therein.

When the 8 bits of data are shifted in the shift register 758, a control circuit 7500 activates the synchronous detecting circuit 756, CRC (cyclic redundancy check) circuit 757, and transfers the content of the shift register 758 in parallel to the receiving data register 755.

When the synchronizing code based on the high level data transmission process protocol is detected, the synchronous detecting circuit 756 sets the flag showing "data received" provided at the status register 754. Further, the CRC check circuit 757 carries out a CRC calculation of the received data until the instruction ending the data reception is output from the control circuit 7500 to the CRC check circuit 757. Hereinafter, every time the control circuit 7500 receives the serial data of 8 bits, the control circuit 7500 transfers repeatedly the content of the shift register 758 to the received data register 755.

When the flag is set in the status register 754, an encoder 751 is started by the flag.

The encoder 751 generates a code signal of a parallel 3 bits, allocated to the receiving line control circuit, and outputs this in parallel to the interrupt signal line $i_{ac}$.

Accordingly, the interrupt process program corresponding to the code signal of the intermediate CPU 71 is started.

Further, when another process is being executed, the intermediate CPU 71 carries out a priority process by the included hardware circuit, and if the interrupt level of the process now being executed is high, carries out a hold procedure of the interrupt process. Conversely, if the interrupt level of the process is low, the CPU 71 carries out a save process such as PSW (Program, status, word) of the process which is presently being executed.

When a 68008 Microprocessor, manufactured by Motorola, is used as the intermediate CPU these processes are carried out automatically inside the large scale integrated circuit (LSI).

Therefore, the program having a flow specified by a 3 bit code of the interrupt signal and shown in FIG. 8A is actuated.

In the intermediate CPU 71 flow of FIG. 8A, after the priority process of above-mentioned intermediate CPU 71 is ended, the following steps are commenced.

Step 1

The intermediate CPU 71 starts the driver 752 shown in FIG. 7, and reads the data of the status register 754.

Step 2

It is determined whether or not the flag position showing the beginning of the reception of this status register 754 is set.

If this flag position is not set and another flag, such as that for a receiving obstacle, etc., is set, the program flow goes in the "NO" direction, and the other process is carried out. In this embodiment, the other process is omitted because, the method of this other process is not related to the invention. However, when the interrupt process exists in the other process mentioned above, it may be considered that it is actuated by a similar flow as mentioned later.

Step 3

When the intermediate CPU 71 judges, in step 2, that data reception has commenced, the flow goes to this step.

In this step, the intermediate CPU 71 starts the driver 753 shown in FIG. 7, reads the content of the received data register 755, and transfers the same to a specified address of the memory 70 shown in FIG. 3.

In FIG. 7, the synchronizing detect circuit 756 detects the synchronizing code provided when the reception is ended. The control circuit 7500 judges the detecting signal of this synchronizing code as showing that the reception is ended.

Based on this judgement, the control circuit 7500 sets the reception end flag of the status register 754, and sets the flag showing whether the result of the check by CRC check circuit 757 is normal or not to the status register 754.

Step 4

In this step 4, the intermediate CPU 71 again reads the content of the status register 754.

Step 5

In this step 5, the intermediate CPU 71 judges the content of the status register 754 read in step 4, and judges whether or not the end flag is set.

When the end flag is not set, the flow returns the step 2 already mentioned, and step 2 to step 5 are repeated.

When the end flag is set, the flow goes to step 6.

Step 6

When the reception is completed, the intermediate CPU 71 in FIG. 3 via the DMA control circuit (shown in FIG. 4B by 73b9) provided in the interrupt control circuit 73b, transfers the received data stored in the memory 70 to a received buffer region 10B, previously determined in the main memory 10, by using a direct memory access process.

Figure 4B:
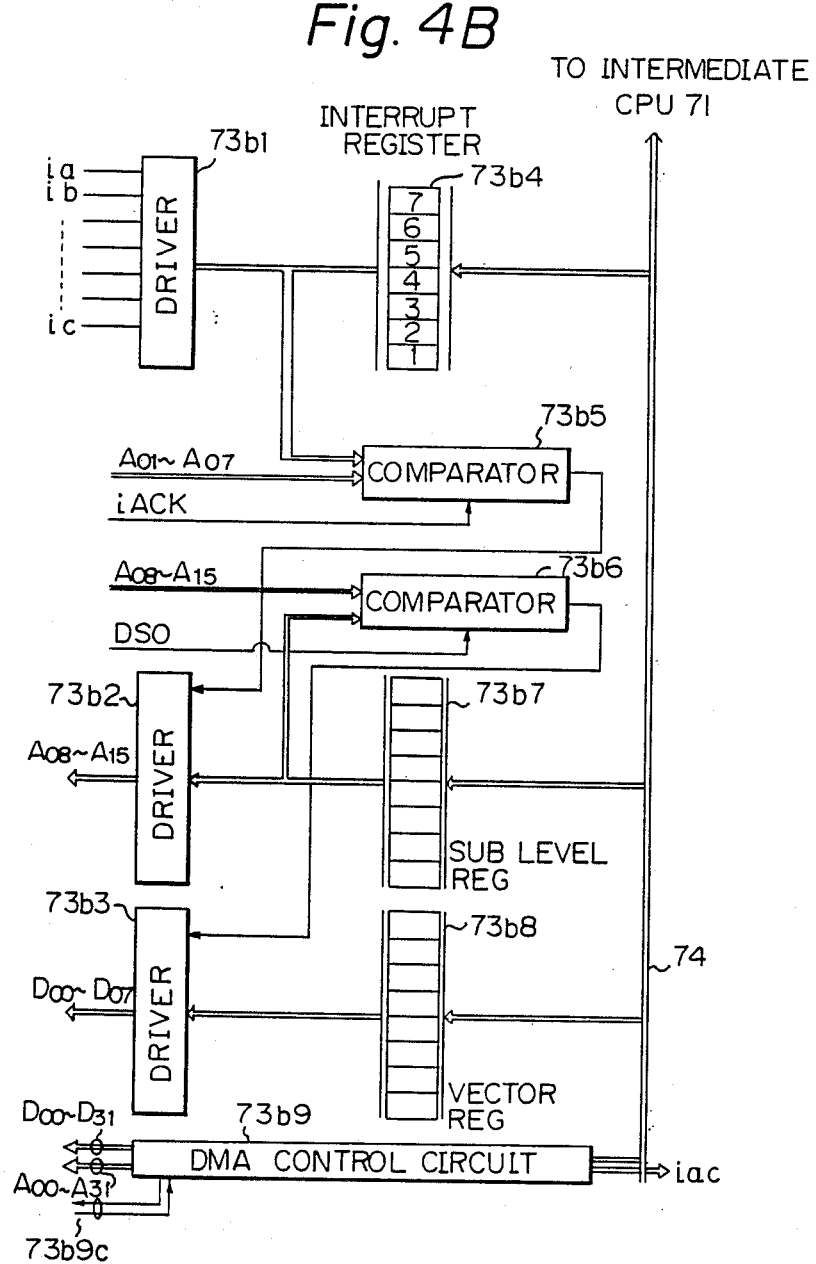

In FIG. 4B, a detailed construction of the DMA control circuit 73b9 is omitted. In the DMA control circuit 73b9, a head address and a data length of the buffer region of the main memory 10 are set, and the intermediate CPU 71 first sets the read head address and the data length of the memory 70 to the DMA control circuit 73b9.

Based on this setting, the DMA control circuit 73b9c generates a signal to the control signal line 73b9c to obtain the right to use the bus 11 shown in FIG. 3.

Based on this signal, an admission signal is generated from the main CPU 1 to the DMA control circuit 73b9.

When the DMA control circuit 73b9 receives the admission signal via the control signal line 73b9c, the address is output, by a predetermined transmission timing, from a head address of the region of both memories 10 and 70, set as mentioned above, to the address bus A00~A31, respectively, and the received data corresponding to the portion of the length which is set is transmitted by using the data bus D00~D31, respectively.

When the transmission of all received data is completed, the end information is sent to the intermediate CPU 71.

Step 7

In step 7, the intermediate CPU 71 stores the status information, showing the end of the normal reception, in the status storing region in the main memory 10.

When the above-mentioned DMA control circuit 73b9 transmits this status signal, as the final address data in the DMA transmission, the intermediate CPU 71 sets the word showing that the normal reception is ended, in the final address of the region for storing the received data in the memory 70, before going to Step 7.

As a result, the word showing the normal reception is completed is stored automatically in the area 10A of the main memory 10 in FIG. 3.

Step 8

In this step, the intermediate CPU 71 reads the interrupt level information registered in the table memory 72, sets the same to the interruption control circuit 73b, and obtains the interrupt level information of the line receiving control circuit as the interruption generating source 75 for carrying out the interruption to the main CPU 1.

Figure 8B:
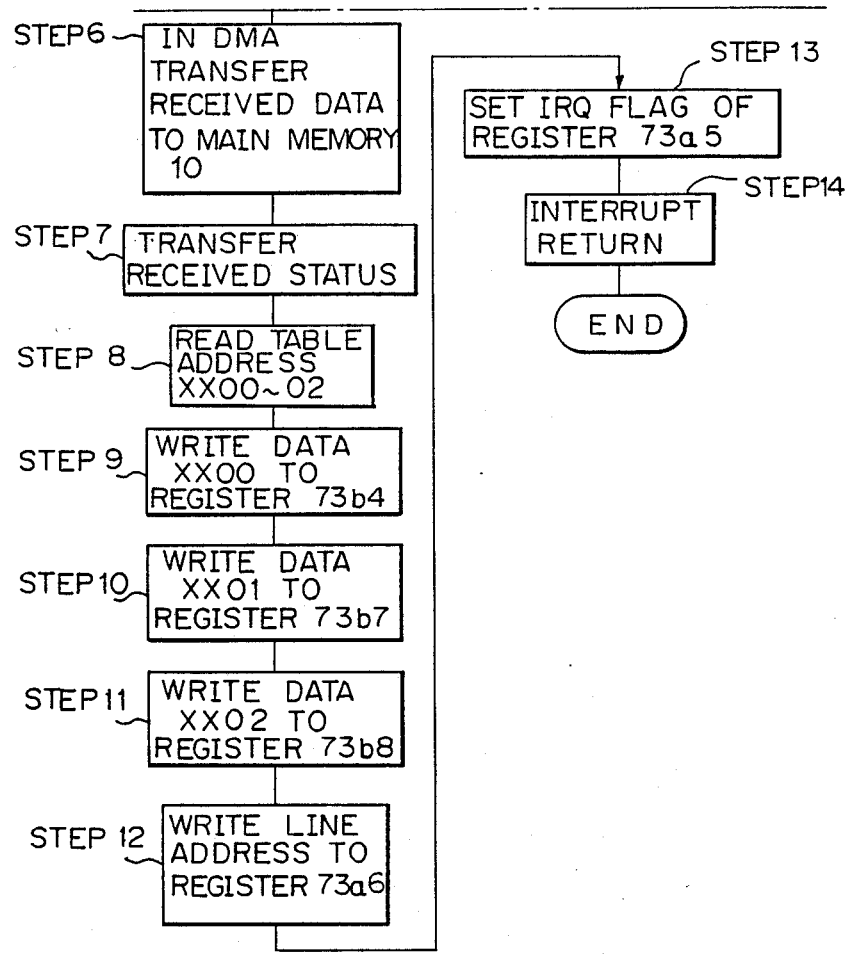

In this case, in the read addresses "XX00" to "XX02", one address for the routine shown in the flow in FIG. 8B, especially for the routine from step 3 to step 14, is allocated. Therefore, when the addresses "XX00" to "XX02" are previously written in the program of this flow, the intermediate CPU 71 can automatically obtain the corresponding interrupt level information from the table memory 72.

Step 9

In this step, the intermediate CPU 71 writes, to raise (based on the address data "XX00" of the table memory shown in FIG. 6), any one bit of the interrupt register 73b4 shown in FIG. 4B. At this time, the intermediate CPU 71 interprets the main interrupt level stored in lower 3 bits among the information obtained by reading the address "XX00" from the table memory 72 in Step 8. As a result, when the value "1" is shown as a decimal value, the intermediate CPU 71 converts the data in which a first bit position, among the data supplied to the register 73b4, becomes logic "1" and the other becomes logic "0". Thereafter, the converted data is set in the interrupt register 73b4.

Step 10

In this step, the intermediate CPU 71 interprets the read data from the address "XX01" of the table memory 72, that is, sub-level B, and converts this to an 8 bit parallel signal, as in step 9. Thereafter, the intermediate CPU 71 sets the converted 8 bit data in the register 73b7.

Step 11

In this step, the intermediate CPU 71 sets the vector number of 8 bits read from the address "XX02" of the table memory 72 to the vector register 73b8 and driver 73b3.

Step 12

In this step, the intermediate CPU 71 sets the address (device address IDVA) allocated to the line receiving control circuit as the inerruption generating source 75 to the register 73a6 shown in FIG. 4A.

Step 13

Next the intermediate CPU 71 sets the interrupt flag iRQ of the status register 73a5 shown in FIG. 4A to a logic level "1" and displays the information that the adapter is in an interrupt state.

Step 14

In this step, the intermediate CPU 71 returns to an initial state.

That is, while the intermediate CPU 71 is executing a process having a lower level than the other process, where the higher level process in the intermediate flow shown in FIG. 8 is interrupting, the interrupted process is recovered at this step.

The operation of interrupt control circuit will be explained by referring to FIG. 4B.

In the above-mentioned step 9, the data of the main interruption level is set from the intermediate CPU 71 to the interrupt register 73b4. As a result, a driver 73b1 actuates one interrupt signal line corresponding to a bit position in which a logic level becomes "1" in the interrupt register 73b4, among the interrupt signal lines $i_a \sim i_c$, for example, the interrupt signal line $i_a$ is made to logic level "1" and the interrupt signal is transmitted to the main CPU 1.

By this interrupt signal, the main CPU 1 executes the control process having a priority of the intermediate CPU 71 already mentioned. Thereafter, when the main CPU 1 gives permission to the adapter, the main CPU 1 supplies the data, which is the same as the data set in the interrupt register 73b4, to the address bus lines A01-A07 and returns the $i_{ack}$ signal, that is, the interrupt permission signal.

A comparator circuit 73b5 compares the data shown in the address bus line A01~A07 and the stored data in the interrupt register 73b4 by the timing of the $i_{ack}$ signal.

When these data coincide, the driver 73b2 is actuated, and the sub-level data stored in the sub-level register 73b7 is supplied to the address bus A08-A15.

The same or an equivalent circuit as shown in FIG. 4B is also provided in the other circuit, for example, in the host side line control circuit 2.

For example, when the main interrupt level of the circuit 2 is at the same level as the main interrupt level of the above-mentioned interrupt level of the adapter 7, the interrupt sub-level data is output to the address bus, from the circuit 2 as well. However, each interrupt sub-level is set to have a different level.

In FIG. 4B, in the comparator circuit 73b6, the data having only a one bit logic level "1" generated from the driver 73b2 to the address bus A08~A15 and the data having only a one bit logic level "1" generated from the circuit 2 to the address bus A08~A15, are synthesized and the address bus A08~A15 is given as the input of the comparator circuit 73b6.

As mentioned above, at least at the sub-level step, as the interrupt level is set to be different and when the interruption to the main CPU 1 conflict, the number of bits (maximum 8 bits) coinciding to the number of conflicts becomes logic level "1".

The comparator circuit 73b6 compares the data of the address bus A08~A15 and the data stored in the sub-level register 73b7 by using the timing of a DSO signal separately generated from the main CPU 1.

For example, whether or not the bit having the logic level "1" exists at a position higher than the bit position having the logic level "1" of the register 73b7, is judged in a logic circuit included in comparator circuit 73b6.

When the bit having the logic level "1" exists at the above-mentioned position, the following operation is not carried out.

If the logic level "1" of the register 73b7 exists only at the same position as that where the logic level of the register 73b7 is "1", or only at a lower position, the comparator circuit 73b6 generates a start signal for the driver 73b3.

By this start signal, a vector number data stored in the vector number register 73b8 is supplied to the data bus D00~D07.

In FIG. 8A and FIG. 3, the main CPU 1 goes to a point ST and executes Step 1 in accordance with the vector number received after the above-mentioned priority control process.

Step 1

In this step 1, the main CPU 1 reads the status register 75a5 shown in FIG. 4A and the register 73a6 in which the address of the interrupt device is set.

Based on the reading of this data, the interrupt signal generating source 75 is identified in the control circuit of the terminal side circuit 50.

Step 2

Next, for judging whether or not the receiving status set in the area 10A of the main memory 10 shows normal reception, the area 10A is read out from the main memory 10.

Step 3

In this step 3, the main CPU 1 sequentially interprets the received data set in the area 10B of the main memory 10.

This process is executed by an application program stored in another region of the main memory 10, so that any process can be executed.

Step 4

At the end of the receiving process, the main CPU 1 executes an interrupt return process as in Step 14 shown in FIG. 8.

As explained in detail above, according to the present invention, (1) The intermediate process device processes together, the interrupt signal of a plurality of interrupt generating sources provided in an adapter, so that one interrupt is executed by the main CPU 1. Therefore, the load for the interrupt process on the main CPU 1 can be greatly decreased.

(2) Further, the priority for the process of a plurality of interrupt generating sources is obtained from a table memory in the adapter, so that the priority of the process can be easily changed, and the optimum priority for the system can be made possible.

What we claim is:

1. An interrupt control system in a process execution system having a plurality of sources for generating an interrupt signal, and a main process device for receiving said interrupt signal and interrupting a process being executed in accordance with a process priority of said sources generating said interrupt signal so as to execute the process for said interrupt signal, comprising:

adapter means including
   (a) an intermediate process means for receiving an interrupt signal from the plurality of said interrupt signal generating sources connected thereto having different process priorities, and for receiving process priority information corresponding to the respective process priorities of the plurality of interrupt generating sources;
   (b) rewritable table memory means connected to said intermediate process means for providing the process priority information corresponding to said interrupt signal, and for storing the process priority information;
   (c) means for changing the process priority information for each of the sources for generating an interrupt signal in said rewritable table memory means,
   said intermediate process means includes means for receiving said interrupt signal, for obtaining from said rewritable table memory means the process priority information of the corresponding interrupt signal generating source, and for informing said main process device of the process priority together with said interrupt signal.

2. An interrupt control system according to claim 1, wherein said plurality of interrupt signal generating sources connected to said intermediate process means includes a plurality of file memory devices and a key input device, said key input device being set for said intermediate process means, so that the process priority of said intermediate process means is higher than that of said plurality of file memory devices.

3. An interrupt control system according to claim 1, wherein said main process device informs said intermediate process means of the process priority of each of said plurality of interrupt signal generating sources,
   wherein said rewritable table memory means is formed by a rewritable memory, and
   wherein said intermediate process means stores the process priority in said rewritable memory corresponding to each of said plurality of interrupt signal generating sources.

4. An interrupt control system according to claim 1, wherein said main process device includes a plurality of interrupt signal receiving terminals, each corresponding to one of said process priorities, and
   wherein said intermediate process means, in accordance with said process priority obtained from said rewritable table memory means, selectively starts a signal line corresponding to a plurality of interrupt signal lines connected to said interrupt signal receiving terminals.

5. An interrupt control system according to claim 4, wherein said main process device and said adapter means are connected by a bus signal line,
   wherein the interrupt signal generating sources, which are connected to said adapter means, are not connected to said bus signal line, and
   wherein the interrupt signal which is generated by said interrupt signal generating sources not connected to said adapter means is supplied to said interrupt signal line.

6. An interrupt control system according to claim 4, wherein said table means stores the process priority as code, and
   wherein said intermediate process means converts said code so as to start one selected interrupt signal line.

* * * * *